(No Model.) 2 Sheets—Sheet 1.

H. BUNKER.
CLUTCH PULLEY.

No. 521,281. Patented June 12, 1894.

Witnesses
H. J. McMillen
Donald C. Ridout

Inventor
Herman Bunker
by C. H. Riches
his atty

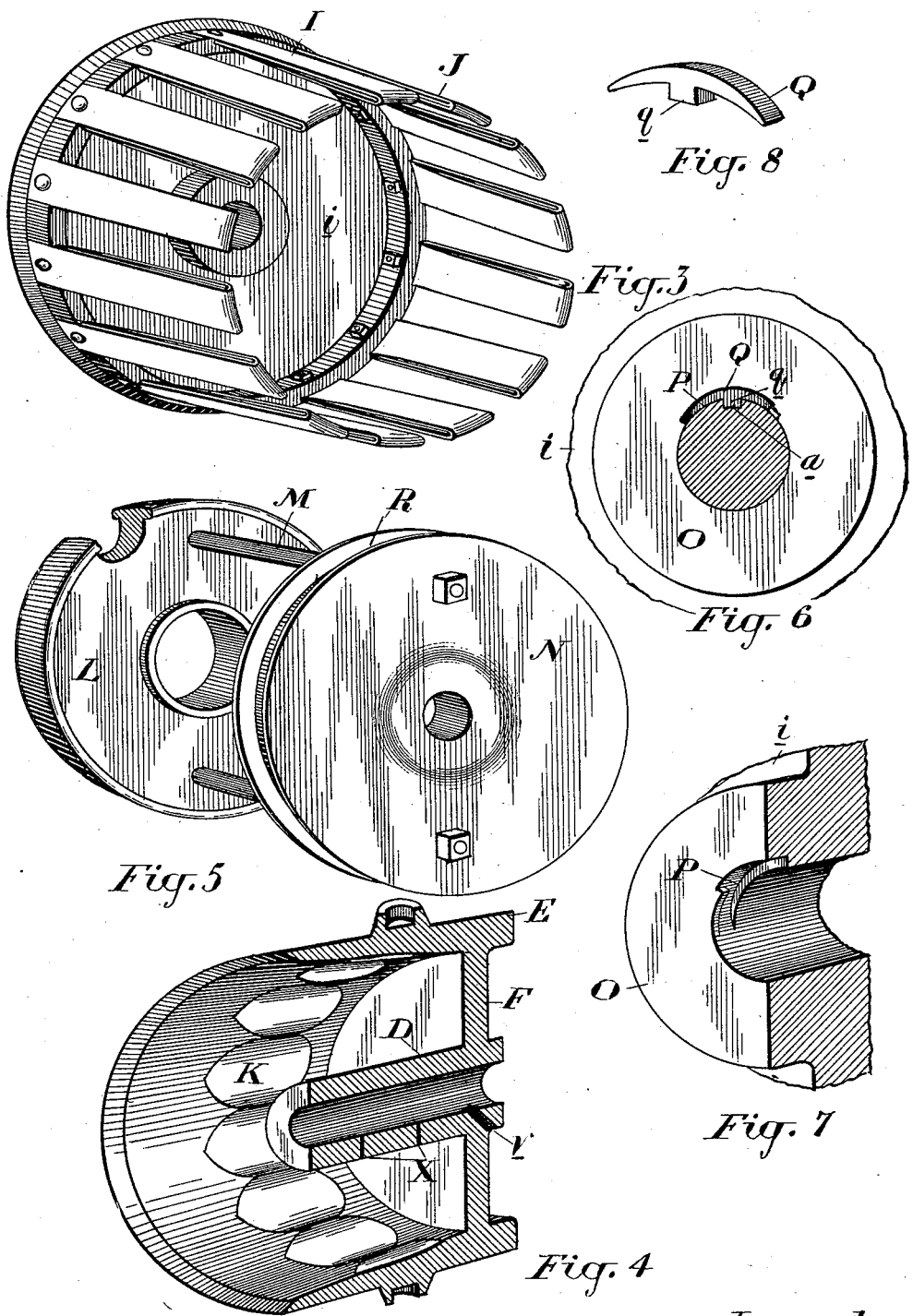

UNITED STATES PATENT OFFICE.

HERMAN BUNKER, OF BARRIE, ASSIGNOR OF ONE-THIRD TO WALTER PECK CHAPMAN, OF HAMILTON, CANADA.

CLUTCH-PULLEY.

SPECIFICATION forming part of Letters Patent No. 521,281, dated June 12, 1894.

Application filed February 3, 1894. Serial No. 498,973. (No model.)

*To all whom it may concern:*

Be it known that I, HERMAN BUNKER, of Barrie, in the county of Simcoe and Province of Ontario, Canada, have invented certain new and useful Improvements in Clutch-Pulleys; and I hereby declare that the following is a full, clear, and exact description of the same.

This invention relates to certain new and useful improvements in clutch pulleys, and the object of the invention is to provide the clutch pulley with one clutch member comprised of a disk or plate having a series of outwardly extending springs substantially parallel with the hub of the same, and providing the other clutch member with a seat for each of the said springs, into each of which one of the said springs is adapted to enter to lock together the said clutch members and to provide the clutch members with a plunger adapted to expand the springs into the said seats to cause the interlocking of the said clutch members, the whole device being constructed as hereinafter set forth and more particularly pointed out in the claims.

Figure 1:
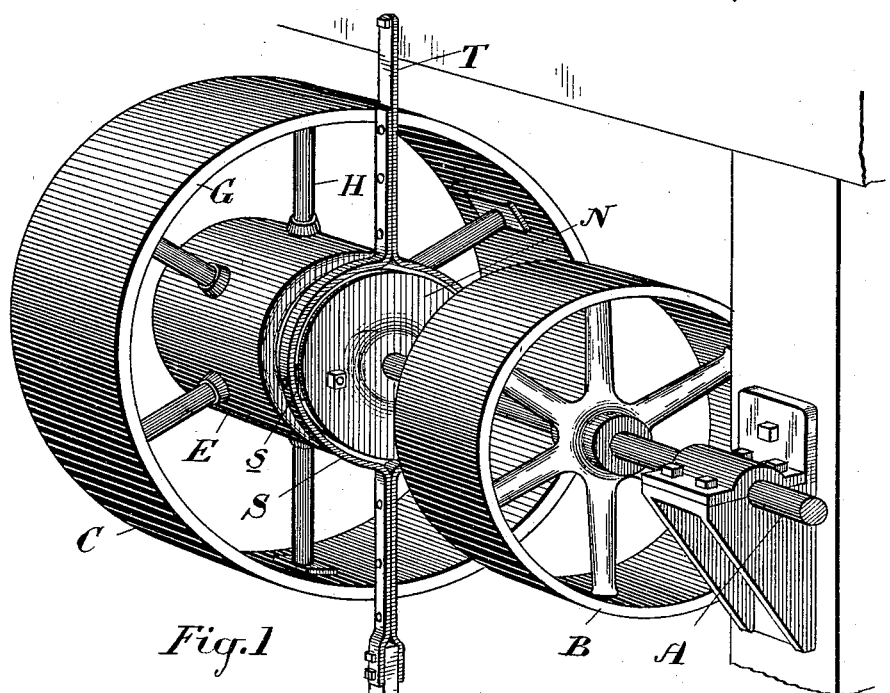
Figure 2:
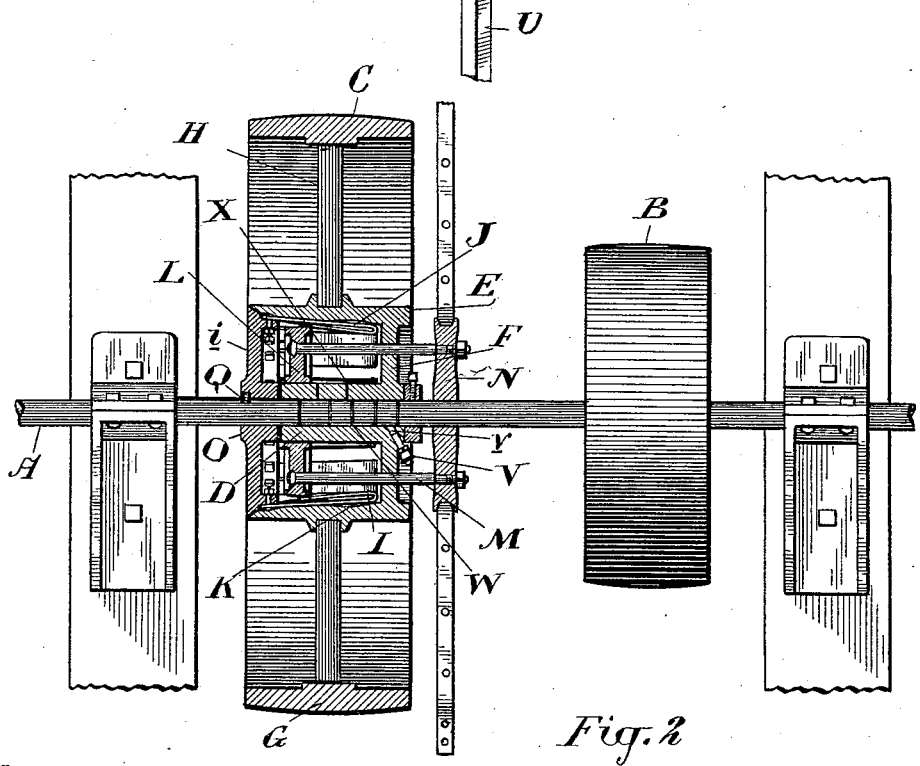

In the drawings: Figure 1 is a perspective view of the complete device. Fig. 2 is a view showing the clutch pulley and clutch members in section. Fig. 3 is a perspective view of one of the clutch members. Fig. 4 is a perspective view of the other clutch member in section. Fig. 5 is a perspective view of the plunger. Fig. 6 is an end elevation of a portion of the clutch member shown in Fig. 3 to illustrate the key locking the said clutch members to the shaft. Fig. 7 is a perspective view of a section of the hub of the clutch member shown in Fig. 3 to illustrate the means for locking the key to the clutch member. Fig. 8 is a perspective view of the key.

Like letters of reference refer to like parts throughout the specification and drawings.

In the drawings A refers to the shaft, and B refers to a fast pulley mounted upon the shaft by means of which motion is transmitted to the shaft. Loosely mounted upon the shaft A is the clutch pulley C, consisting of a hub D fitted loosely to the shaft A, a drum-shaped clutch member E surrounding the hub D and connected thereto at one end by a plate F, and a rim G connected to the clutch member E by means of spokes or arms H. Mounted fast upon the shaft A is a disk $i$ having a series of outwardly extending flat springs J riveted or bolted thereto and adapted to enter within the clutch member E. Formed in the clutch member E are a series of seats K equal in number to the number of flat springs J, and arranged to receive the same. Mounted loosely, and sliding, on the hub D is a plunger which consists in this case of a plunger head L connected by two rods or arms M to a slide-head N loosely mounted upon the shaft A and clear of the clutch pulley C. The plunger head L is of a sufficient size to expand the springs J into the seats K when the said plunger head is slid upon the hub D, in order that the said springs will interlock with the seats K and cause the clutch member E to revolve with the clutch member I and shaft A. The arms or rods M pass through openings in the plate F, and it might here be stated that the plunger head L, rods or arms M, and the slide head N revolve with the clutch pulley C while the clutch members are interlocked. The hub O of the disk $i$ is provided with a key seat P adapted to receive the key Q locking the disk $i$ to the shaft A. The key Q, it will be noticed, consists of a piece of curved metal having a lug $q$ adapted to enter a recess or groove $a$ in the shaft A, and it will be noticed by reference to the drawings that the key seat P is so constructed that it will admit of the entrance of the key into the hub O, and that when entered therein the key will turn into the seat P and be held therein, in such a manner that the clutch member and shaft during their revolution will not separate nor the clutch member be permitted to slide on the shaft A. The slide-head N is provided with a circumferential groove R and is encircled by a ring S having lugs $s$ adapted to enter the groove R and lock together the ring and the slide head. The ring S is connected to a hanger T pivotally connected to the timbers or rafters of the frame supporting the shaft, and is also connected to a lever U, by means of which the slide-head is slid upon the shaft A. The sliding movement of the slide-head N either draws respectively the plunger head L into or out of contact with the flat springs J, and either causes the springs J to interlock with the seats K, or releases the springs J from the seats K. The hub D is provided with an oil cup V, and an opening v through the hub to the bore by means of which the oil is fed from the said oil cup to the bore.

The shaft A, it will be noticed by reference to Fig. 2 of the drawings, is provided with a series of concentric grooves W to retain the oil within the bore of the hub D, and prevent the oil from leaking out at the ends of the hub. I find it desirable to form through the hub D a series of small openings X by means of which a small quantity of the oil within the bore of the hub can find its passage through the said hub to lubricate the springs J and the outer face of the hub, to admit of the plunger head L sliding freely upon the said hub and against the springs J.

Having thus fully described my invention, what I claim as new, and desire to secure by Letters Patent, is—

1. In a friction clutch, the combination of a clutch disk, a series of outwardly extending springs attached thereto, and substantially parallel with the axis thereof, with a drum shaped clutch member provided with a seat for each of said springs, a plunger adapted to expand the springs into said seats, and means for moving the said plunger, substantially as specified.

2. In a friction clutch the combination of a clutch disk, a series of outwardly extending springs attached thereto, and substantially parallel with the axis thereof, the hub having a key seat constructed to lock the key therein, the shaft having a recess formed therein, the key provided with a lug adapted to enter the recess in the shaft to lock the disk to the shaft a clutch pulley having a hub loosely mounted on the shaft, a drum shaped clutch member surrounding the said hub and connected thereto by a plate, said clutch member having a seat for each of the springs on the disk, a plunger loosely mounted and slidable on said hub and adapted to force the springs into the said seats, and means for moving the plunger into or out of engagement with the said springs, substantially as specified.

3. In a friction clutch the combination of a clutch disk, a series of outwardly extending springs attached thereto and substantially parallel with the axis thereof, the hub having a key seat constructed to lock the key therein, the shaft having a recess formed therein, the key provided with a lug adapted to enter the recess in the shaft to lock said disk to the shaft, a clutch pulley having a hub loosely mounted on the shaft, a drum shaped clutch member surrounding said hub and connected thereto by a plate, said clutch member having a seat for each of the springs on the said disk, a plunger loosely mounted and slidable on said hub and adapted to force the springs into the said seats, a slide head loosely mounted upon the said shaft and clear of the clutch pulley, rods connecting the plunger with the slide head, and means for slidably moving the slide head on the shaft to move the plunger into or out of engagement with the said springs, substantially as specified.

4. In a friction clutch the combination of a clutch disk, a series of outwardly extending springs attached thereto and substantially parallel with the axis thereof, the hub having a key seat constructed to lock the key therein, the shaft having a recess formed therein, the key provided with a lug adapted to enter the recess in the shaft to lock said disk to the shaft, a clutch pulley having a hub and loosely mounted on the shaft, a drum-shaped clutch member surrounding said hub and connected thereto by a plate, said clutch member having a seat for each of the springs on the disk, a plunger loosely mounted and slidable on said hub and adapted to force the springs into said seats, a slide-head loosely mounted upon said shaft and clear of the clutch pulley, said slide-head having a circumferential groove formed therein, a ring encircling the slide head and having lugs adapted to enter the groove a hanger connected to said ring and pivotally connected to a frame work, and a lever connected to said ring, by means of which the slide-head is slid on the shaft, substantially as specified.

Barrie, January 18, 1894.

HERMAN BUNKER.

In presence of—
   GEO. W. TRAUT,
   GEO. STRAWBRIDGE.